United States Patent [19]

Sallis

[11] Patent Number: 4,741,609

[45] Date of Patent: May 3, 1988

[54] STRETCHED MEMBRANE HELIOSTAT WITH INTEGRAL BLADDER

[76] Inventor: Daniel V. Sallis, 5720 Blue Sage Dr., Littleton, Colo. 80123

[21] Appl. No.: 940,915

[22] Filed: Dec. 12, 1986

[51] Int. Cl.⁴ .......................... G02B 5/08; G02B 7/18
[52] U.S. Cl. ................................. 350/608; 343/915
[58] Field of Search ........................... 350/608, 607; 343/914–916, 840

[56] References Cited

U.S. PATENT DOCUMENTS

| | | | |
|---|---|---|---|
| 3,054,328 | 9/1962 | Rodgers | 350/608 |
| 3,326,624 | 6/1967 | Maydell et al. | 350/608 |
| 3,471,860 | 10/1969 | Amburgey | 343/915 |
| 3,552,835 | 1/1971 | Benzies | 350/608 |
| 3,880,500 | 4/1975 | Kojabashian | 350/608 |
| 3,936,159 | 2/1976 | Pavenick | 350/608 |
| 4,288,146 | 9/1981 | Johnson et al. | 350/608 |
| 4,382,657 | 5/1983 | Lemaitre | 350/608 |
| 4,487,196 | 12/1984 | Murphy | 350/607 |

FOREIGN PATENT DOCUMENTS

| | | | |
|---|---|---|---|
| 1048681 | 4/1953 | France | 350/608 |
| 1145474 | 10/1957 | France | 350/608 |
| 1354837 | 2/1964 | France | 350/608 |

Primary Examiner—Jon W. Henry
Attorney, Agent, or Firm—Charles C. Corbin

[57] ABSTRACT

A stretched membrane heliostat having a membrane mounted on a generally circular frame, there being a double-walled portion of the membrane that extends in a circle near the periphery of the membrane to form a bladder that is inflatable to tension the membrane.

15 Claims, 2 Drawing Sheets

STRETCHED MEMBRANE HELIOSTAT WITH INTEGRAL BLADDER

BACKGROUND

This invention relates to apparatus for tensioning a membrane of sheet material over a support frame, the stretched membrane being used to support a solar reflecting surface. In the manufacture of heliostats that use a taut membrane held over a support frame it is necessary to generate and maintain a uniform tensioning force in the membrane so as to provide a smooth planar surface for high efficiency solar reflection. Problems initially arise with respect to how to pull the membrane to the high tension levels which can be in the 50 to 100 pounds-per-inch range. Conventional methods of installing a tensioned membrane over a support frame required either the membrane alone or the frame alone being loaded during the attachment of membrane to frame. This necessitated the loaded element to be overloaded to achieve the desired final tension. To achieve these extra high loads required investment in a substantial structural fixture. Another area of concern lies with maintaining the stretched membrane at the desirable level of tension. For example, rivets and screws have a significant slippage and will relieve a large portion of the preload, bond materials may creep with time, and welding is difficult since the material is under load. In addition, ambient temperature changes will cause significant tension changes in the membrane, particularly when materials with different coefficients of expansion are used in support frame and membrane. Another problem with the prior art stems from support frame manufacturing errors and the existence of in-plane frame deflections which result in non-uniform membrane strain. In addition, former heliostat designs do not lend themselves to the convenience of attachment of membrane to frame in the field.

SUMMARY OF INVENTION

In view of the foregoing it is an object of the present invention to provide an apparatus for tensioning a membrane which does so by preloading the membrane and its support frame simultaneously.

Another object of the invention is to provide a solar reflector having the capability to vary the tensioning forces in the reflective surface supporting membrane as necessary so as to maintain the membrane at the most desirable tension load. It is a further object of the invention to provide a membrane tensioning apparatus that avoids the build-up of non-uniform strain in the membrane so as to achieve a uniformly loaded, smooth planar surface.

A still further object of the invention is to provide a heliostat which is suitable for in-the-field connection of membrane to frame.

Other and further objectives of the invention will become apparent upon referring to the brief summary below, the detailed description thereafter following, and the drawings annexed hereto.

Accordingly, the present invention provides an apparatus for tensioning a membrane on a support frame while simultaneously loading both support frame and membrane. The frame and membrane are preferrably circular in planform. There is a peripheral portion of the membrane that is double-walled and which extends in a circle. This double-walled portion and the interwall space define a fluid-inflatable bladder.

Circumferentially extending portions of the membrane that are radially outward of the bladder attach to the support frame. Pressurization of the bladder will simultaneously induce compressive forces on the frame and uniform tensioning forces in the membrane. In one embodiment of the invention the bladder is pressurized by the liquid phase of a hardenable substance which is allowed to solidify to permanently hold the membrane at a desired tension. In another embodiment of the invention which permits the use of a frame that exhibits a low-torsional stiffness prior to membrane attachment, there are two membranes—one membrane engaging the top edge of the frame and the other engaging the bottom edge.

It is noted that portions of this invention were made with government support under DOE Contract No. EG-77-C-01-4042, SERI Sub IP-2-02060.

BRIEF DESCRIPTION OF THE DRAWINGS

FIG. 8 is a partial sectional view of an embodiment using a tubular frame.

DETAILED DESCRIPTION OF THE DRAWINGS

Figure 1:
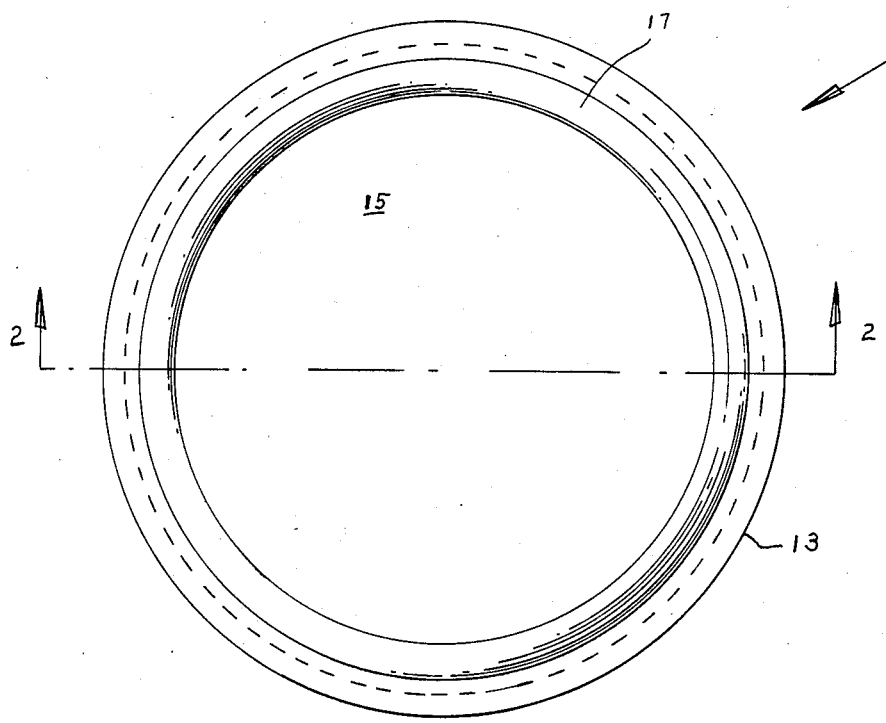
FIG. 1 is a top plan view of the apparatus of the invention.
Figure 2:
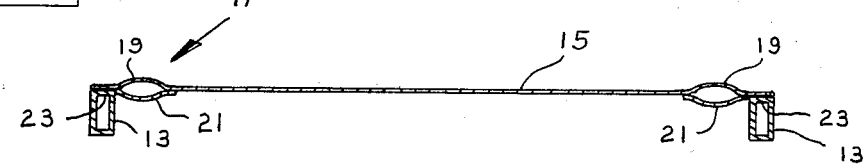
FIG. 2 is a sectional view taken along the line 2—2 of FIG. 1.

FIGS. 1 and 2 show a stretched membrane heliostat 11 that includes a steel support frame 13. The cross-section of frame 13 is a rectangular tube for which the height, width and thickness may be selected to provide the required torsional stiffness and out-of-plane bending stiffness. A circular frame 13 is preferred since it is the most efficient structure for loading. A circular membrane 15 comprising thins sheet (0.012 in.) steel, and having an integral bladder 17 formed from double wall portions 19 and 21 is affixed to the upper wall 23 of frame 13 by conventional means such as welding, rivoting or bonding with high strength adhesive. In one embodiment of the invention the membrane is releasably attached to frame 13 by a system of circumferentially extending bolts and nuts. This allows quick assembly and disassembly of membrane 15 in the field and elsewhere. The most efficient membrane material is one with the highest strength to weight ratio that can be obtained in the 0.005 in. to 0.012 in. thickness range. The bladder 17 is formed when the annular strip 21 is welded or bonded to the lower surface of membrane 15, opposite the portion 19. The welding or bonding provide hermetic seams.

Figure 3:
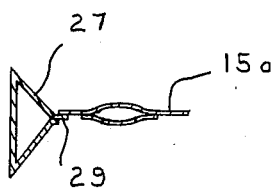
FIG. 3 is an enlarged partial sectional view of an embodiment having a frame with a triangular cross-section.

In another embodiment of the invention, shown in FIG. 3, a support frame 27, having a triangular cross-sectional figuration, is used. Here, the membrane 15a is affixed by conventional means to the inner tab portion 29 of frame 27. The wall 19 holds a fluid valve (not shown) of conventional design to which means for pressurizing bladder 17 either hydraulically or pneumatically is connected. In order to minimize weight of pneumatic system is preferred.

Still another embodiment is shown in FIG. 8. Here the frame 28 is of a tubular construction, and circular in planform as are the other preferred embodiments. The membrane 15(b) of similar construction to membrane 15, is attached by conventional means to the circumferentially extending inner tab 30.

When the invention is to be assembled in the configuration shown in FIGS. 1 and 2, the membrane 15, with bladder 17 unpressurized, is aligned with frame 13 and affixed thereto by means previously described. Bladder 17 is then gradually pressurized until the resulting tension in membrane 15 reaches the desirable level. This loading procedure will provide for a self-centering tendency of the membrane to an equilibrium position which will tend to uniformly strain the membrane. It will also have a stabilizing effect on any in-plane deflections and manufacturing errors in the support frame.

In a further embodiment of the invention, the bladder 17 is pressured to a desired level with a liquid mixture which will solidify into a rigid mass after curing. A silicone rubber would be suitable for this purpose. This rigidizing of the membrane provides for a stabilizing effect on the heliostat.

Figure 4:
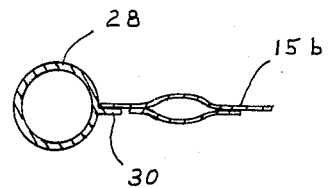
FIG. 4 is a partial, broken plan view of an embodiment having double membranes.
Figure 4:
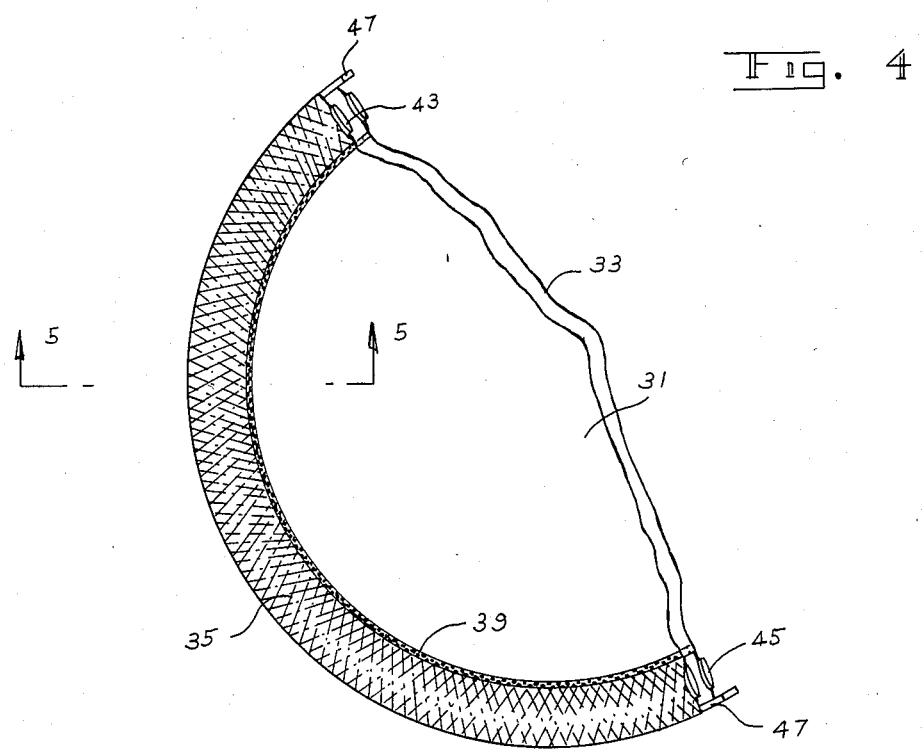
Figure 5:
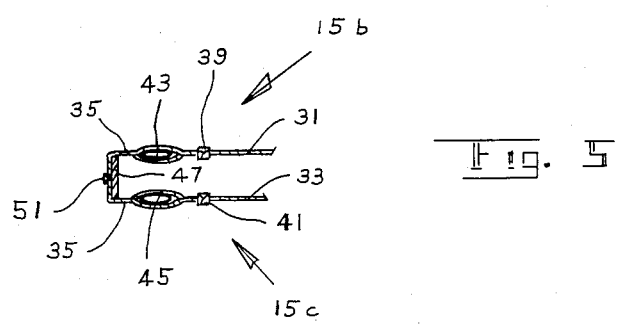
FIG. 5 is a sectional view taken along the line 5—5 of FIG. 4.

The double membrane embodiment shown in FIGS. 4 and 5 has a top membrane 15b and a bottom membrane 15c which include the major metallic portions 31 and 33 which are interconnected by way of a connective woven material 35 which extends from upper zippers 39 around frame 47 and to the lower zipper 41. The zippers are of conventional design. The woven material 35 is of a substance suitable for outdoor exposure such as an ultraviolet stabilized polypropylene, however glass cloth, rayons and other high strength fabrics may be used. Wire fabric is also suitable. The strands of material 35 are arranged in a bias pattern which is symmetrical with respect to the radial direction at all locations around frame 47. Inner bladders 43 and 45 shown in FIG. 5 are composed of an elastomer such as Butyl rubber. This double membrane embodiment permits the use of frames having low torsional stiffness such as the frame 47 which is a ring formed from flat bar stock. Such a frame is more easily formed into a circle than frames of high torsional stiffness such as the frame 1 shown in FIG. 2 which has a closed, hollow cross-sectional configuration. Frames of "I" beam and channel cross-sectional configurations are other suitable constructions having a relatively low torsional stiffness.

Figure 6:
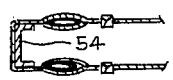
FIG. 6 is a partial sectional view similar to that of FIG. 5 showing a frame having a channel sectional configuration.
Figure 7:
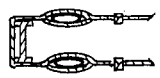
FIG. 7 is a partial sectional view illustrating an embodiment with a frame that has an I-beam cross-sectional configuration.

In this regard FIG. 6 shows a double membrane embodiment using a frame 54 formed from channel bar stock and FIG. 7 illustrates the use of an I-beam frame. Both of these examples of frames support a double membrane structure similar to that shown in FIG. 5.

When the double membranes are attached to frame 47 and tensioned the resultant assembly will have the required torsional stiffness and a high degree of frame flatness is attainable. A preferable method of assembly includes unzipping and detaching portions 31 and 33 and then positioning the connective material 35 around frame 47. The portions 31 and 33 may then be attached via zippers 39 and 41 and the assembly set upon a fixture (not shown) that provides a flat planar aligning surface for frame 47. Bladders 43 and 45 are partially pressurized to provide some membrane tension and the frame 47 is pushed into a flat position against the aligning fixture surface. During this step the connective material 35 can slip relative to frame 47 are required to allow the frame 47 to freely twist into a flat plane. Bladders 43 and 45 may then be further pressurized to tension membrane portions 31 and 33 to the desirable level and the material 35 affixed to the frame by means of fasteners 51. This assembly method ensures that a relatively imperfect and low cost frame may be formed into a flat assembly of high precision.

While there has been described particular embodiment of the invention, it will be obvious to those skilled in the art that various changes and modifications may be made therein without departing from the invention and, therefore, it is aimed to cover all such changes and modifications as fall within the true spirit and scope of the invention.

What is claimed is:

1. A stretched membrane heliostat comprisng:
   a. a generally circular support frame; and
   b. a generally circular membrane having its outermost peripheral portion attached to said support frame, said membrane having a double-walled, generally annular portion near its outer periphery with a sealed space between said double walls defining an inflatable bladder, said bladder having valve means for connecting said bladder to a source of fluid under pressure by which said bladder is presurized so as to induce tension in said membrane while simultaneously compressing said frame.

2. Apparatus as defined in claim 1 wherein said frame has a rectangular cross-sectional configuration.

3. Apparatus as defined in claim 1 wherein said frame is tubular.

4. Apparatus as defined in claim 1 wherein said frame has the cross-sectional configuration of an isosceles triangle with the apex oriented inwardly, and said membrane attached along the apex portion of said frame.

5. Apparatus as defined in claim 1 wherein said membrane is releasably mounted to said support frame.

6. Apparatus as defined in claim 1 wherein said bladder has been pressurized with a chemically solidifiable liquid mixture which has subsequently hardened.

7. A stretched membrane heliostat comprising:
   a. a generally circular support frame; and
   b. a first, generally circular membrane having its outermost peripheral portion attached to said frame and engaging the top side of said frame and a second, generally circular membrane having its outermost peripheral portion attached to said frame and engaging the bottom side of said frame, said first and second membranes each having a doubled-walled, generally annular portion near its outer periphery with a sealed spaced between said double walls defining an inflatable bladder, said bladder having valve means for connecting said bladder to a source of fluid under pressure by which said bladder is pressurized so as to induce tension in said membrane while simultaneously compressing said frame.

8. Apparatus as defined in claim 7 wherein said frame has a solid rectangular cross-sectional configuration.

9. Apparatus as defined in claim 7 wherein said frame has an "I" beam cross-sectional configuration.

10. Apparatus as defined in claim 7 wherein said frame has a channel cross-sectional configuration.

11. Apparatus as defined in claim 7 wherein the torsional stiffness of said frame is substantially higher after said membranes are tensioned than before they are tensioned.

12. Apparatus as defined in claim 7 including zipper means on each of said membranes for removably connecting said generally annular portion to the remaining, major portion of said membrane.

13. Apparatus as defined in claim 7 wherein said annular portions of each of said membranes as well as the outermost peripheral portions are composed of a woven material.

14. Apparatus as defined in claim 13 wherein the strands of said woven material are arranged in a bias pattern which is symmetrical with respect to the radially outward direction at all locations along said frame.

15. Apparatus as defined in claim 7 wherein the outermost peripheral portion of said first membrane connects to the outermost peripheral portion of said second membrane.

* * * * *